(No Model.)
J. C. BROWN.
NUT LOCK.
No. 522,585. Patented July 10, 1894.
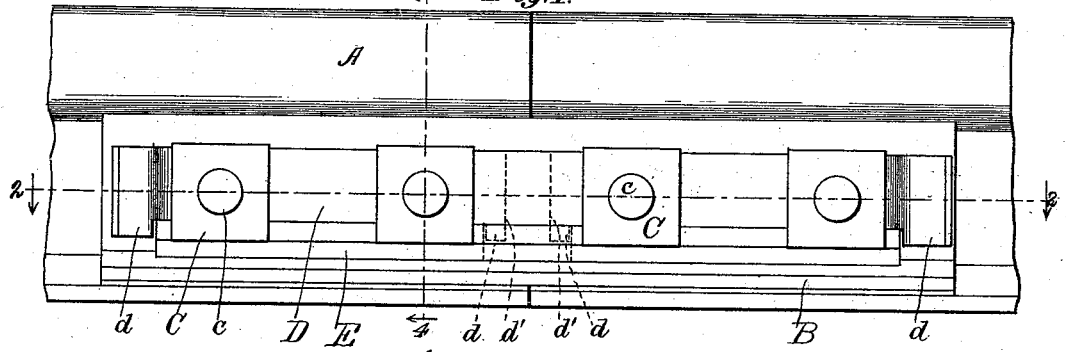
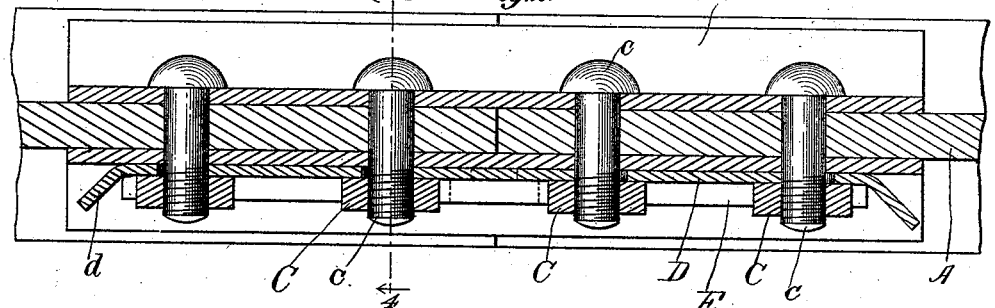
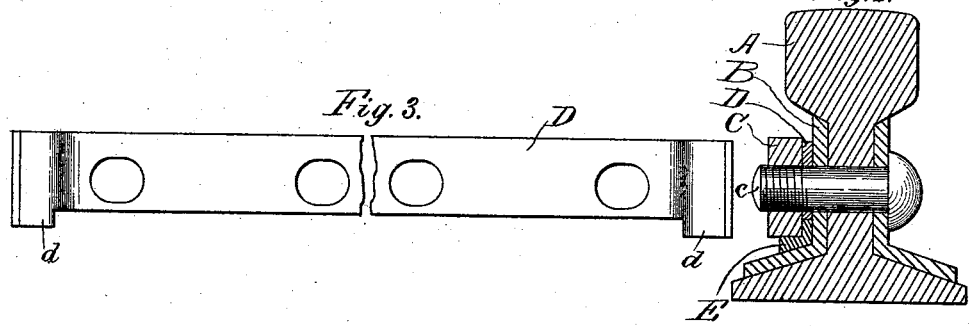
Witnesses:
Rudolph Wm Lotz
Spencer Ward
Inventor:
Julius C. Brown
By Louis K. Gillson
Attorney.

UNITED STATES PATENT OFFICE.

JULIUS C. BROWN, OF SANTA BARBARA, CALIFORNIA.

NUT-LOCK.

SPECIFICATION forming part of Letters Patent No. 522,585, dated July 10, 1894.

Application filed May 25, 1894. Serial No. 512,395. (No model.)

*To all whom it may concern:*

Be it known that I, JULIUS C. BROWN, a citizen of the United States, residing at Santa Barbara, in the county of Santa Barbara and State of California, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to nut-locks of the class used in railway track construction in which a key is inserted behind the nut and has an outwardly projecting flange extending below the nut so as to prevent it from turning.

The object of the invention is to provide against the turning of the washer with the nut so that it will not prevent the entrance of the key.

The invention consists of the use with such key of a strap having suitable bolt holes and thus adapted to serve as a washer for several or all of the nuts.

In the drawings, Figure 1 shows an elevation of a portion of a railroad rail with the improved nut-lock in use. Fig. 2 is a plan section on the line 2—2 of Fig. 1. Fig. 3 is an elevation of the washer. Fig. 4 is a transverse section on the line 4—4 of Figs. 1 and 2.

The railway rail is shown at A, the fish plate at B, the bolts for securing the fish plates at c, and the nuts mounted upon the bolts at C.

A strap of iron is used for a washer for two or more of the nuts, holes being punched in it for the bolts. Both ends of the washer strap project beyond the outer bolts and have downwardly extended lugs $d$. The ends of the strap are bent outwardly, as shown, so as to carry the lug $d$ a sufficient distance from the fish plate to admit of the insertion behind it of the key E, which is of the form shown in my application for Letters Patent filed May 9, 1894, Serial No. 510,596. After the key has been inserted the ends of the washer are bent back to the fish plate by the use of a hammer, so that the lugs $d, d$, fall across the ends of the key and effectually secure it in place.

The washer may be of sufficient length to be applied to all of the bolts of a fish plate or two shorter washer straps may be used, as indicated by dotted lines $d'$ in Fig. 1,—the only essential condition being that it be of sufficient length to be applied to at least two nuts so that it cannot turn when the nut is turned up and thereby bring its lower side oblique to the top of the key so as to prevent the insertion of the latter.

The bolt holes in the washer strap D should be as close to the lower side as practicable so as to allow of the use of a key having a wide upper leaf.

I prefer to market the washer strap with both ends bent so that the key may be inserted from either direction.

I claim as my invention—

The combination with a fish plate and its nuts and bolts of a washer strap apertured for adjustment to a multiple number of bolts and having downwardly projecting lugs at its ends, of a key of angle metal adapted to fit in the angle of the fish plate and having its upper leaf extending behind the nuts and its lower leaf filling the space between the nuts and the foot of the fish plate, substantially as described and for the purpose specified.

In testimony whereof I affix my signature in presence of two witnesses.

JULIUS C. BROWN.

Witnesses:
LOUIS K. GILLSON,
SPENCER WARD.